United States Patent
Futase

(10) Patent No.: US 10,501,224 B2
(45) Date of Patent: Dec. 10, 2019

(54) POURING NOZZLE MADE FROM PACKAGING LAMINATE FILM AND METHOD OF FORMING TEAR-INDUCING FLAW IN PACKAGING LAMINATE FILM

(71) Applicant: YUSHIN CO., LTD., Niigata (JP)

(72) Inventor: Katsunori Futase, Niigata (JP)

(73) Assignee: YUSHIN CO., LTD., Niigata (JP)

( * ) Notice: Subject to any disclaimer, the term of this patent is extended or adjusted under 35 U.S.C. 154(b) by 227 days.

(21) Appl. No.: 15/569,213

(22) PCT Filed: Dec. 13, 2016

(86) PCT No.: PCT/JP2016/086966
§ 371 (c)(1),
(2) Date: Oct. 25, 2017

(87) PCT Pub. No.: WO2017/119241
PCT Pub. Date: Jul. 13, 2017

(65) Prior Publication Data
US 2018/0105308 A1  Apr. 19, 2018

(30) Foreign Application Priority Data

Jan. 4, 2016 (JP) ................................. 2016-000179

(51) Int. Cl.
*B65B 61/02* (2006.01)
*B65D 25/42* (2006.01)
*B65D 75/58* (2006.01)

(52) U.S. Cl.
CPC .............. *B65B 61/02* (2013.01); *B65D 25/42* (2013.01); *B65D 75/5866* (2013.01)

(58) Field of Classification Search
CPC .................................................... B65B 61/02
(Continued)

(56) References Cited

U.S. PATENT DOCUMENTS 3,909,582 A  9/1975 Bowen
5,010,231 A  4/1991 Huizinga
(Continued)

FOREIGN PATENT DOCUMENTS

CN  102089216  6/2011
EP  2522595  11/2012
(Continued)

OTHER PUBLICATIONS

International Preliminary Report on Patentability for PCT/JP2016/086966, dated Jul. 10, 2018, with English language translation.
(Continued)

*Primary Examiner* — Brent T O'Hern
(74) *Attorney, Agent, or Firm* — Greenblum & Bernstein, P.L.C.

(57) ABSTRACT

A pouring nozzle is made from a packaging laminate film which is excellent in the tear-opening property and improves lowering of a liquid draining property in pouring. A method forms a tear-inducing flaw for opening a packaging laminate film suitable for use in a package bag for housing and keeping a liquid packed material. A pouring nozzle is made from a packaging laminate film having a laminate structure of not less than three layers including a base film layer and non-oriented sealant layers laminated on front and rear surface sides of the base film layer and having a pouring path at its central portion. A tear-inducing flaw is formed by irradiating a laser beam across the pouring path and to a position where a portion of at least one of the non-oriented sealant layers on the front and rear surface sides of the base film layer is displaced by pushing.

14 Claims, 3 Drawing Sheets

(58) Field of Classification Search
USPC .......................................................... 428/43
See application file for complete search history.

(56) References Cited

U.S. PATENT DOCUMENTS

| | | | |
|---|---|---|---|
| 2005/0053738 A1 | 3/2005 | Andersson | |
| 2007/0284032 A1 | 12/2007 | Stoppelmann et al. | |
| 2012/0288660 A1 | 11/2012 | Maseiker et al. | |
| 2014/0217119 A1* | 8/2014 | Futase | B65D 25/42 |
| | | | 222/107 |

FOREIGN PATENT DOCUMENTS

| | | |
|---|---|---|
| JP | 3-5091 | 1/1991 |
| JP | 11-077872 | 3/1999 |
| JP | 2001-507318 | 6/2001 |
| JP | 2005-015029 | 1/2005 |
| JP | 2005-520746 | 7/2005 |
| JP | 2012-062066 | 3/2012 |
| JP | 2012-131524 | 7/2012 |
| JP | 2012-162294 | 8/2012 |
| JP | 2012-218799 | 11/2012 |
| JP | 2015-071455 | 4/2015 |
| WO | 98/29312 | 7/1998 |
| WO | 03/080324 | 10/2003 |

OTHER PUBLICATIONS

Office Action issued in China Counterpart Patent Appl. No. 201680038583.4, dated Oct. 23, 2018.
Official Communication issued in Patent Application No. PCT/JP2016/086966, dated Jan. 24, 2017.
Extended European Search Report issued in EP Patent Application No. 16883741.7, dated Jun. 25, 2019.

* cited by examiner

POURING NOZZLE MADE FROM PACKAGING LAMINATE FILM AND METHOD OF FORMING TEAR-INDUCING FLAW IN PACKAGING LAMINATE FILM

TECHNICAL FIELD

This invention relates to a film-shaped pouring nozzle made from a packaging laminate film with a laminate structure of not less than three layers comprised of a base film layer and non-oriented sealant layers laminated on front side and rear side thereof and being excellent in the tear opening property by forming a tear-inducing flaw in a predetermined opening position, and a method of forming a tear-inducing flaw in the packaging laminate film.

RELATED ART

Patent Document 1 discloses a film-shaped pouring nozzle and a method of forming a tear-inducing flaw for forming a pouring port in the pouring nozzle.

The feature of this prior art lies in that when a tear-inducing flaw for forming an opening port for pouring a packed material is formed in a base film layer in a laminate plastic film with a laminate structure comprised of a base film layer and sealant layers laminated on both surfaces of the base film layer, a plastic film having an absorbance rate to a laser beam higher than that of the sealant layer is used as the base film layer and the laser beam is irradiated to a predetermined tearing position in the packaging laminate plastic film and absorbed only by the base film layer to cause sublimation, dissipation or elimination to thereby form a tear-inducing flaw.

PRIOR ART DOCUMENT

Patent Document

Patent Document 1: JP-A-2015-71455

SUMMARY OF THE INVENTION

Task to be Solved by the Invention

In the above prior art, the tear-inducing flaw is formed by irradiating the laser beam to the predetermined tearing position of the packaging laminate film and sublimating only the base film layer to thereby weaken the base film layer as a supporting base material. However, as shown in FIG. 4, the base film layer 2 comes into an inflated state associated with the sublimation or the like, and hence one of the sealant layers 4 laminated on the base film layer 2 causes a stretching deformation and is separated from the base film layer 2 to form a cavity 5. When the packaging laminate film 1 is teared along the thus formed tear-inducing flaw 6 with hands and fingers, tearing force can be reduced by weakening of the base film layer 2, but there is a problem that it is unavoidable to cause the stretching deformation or the like of the sealant film 4 separated from the base film layer 2 as mentioned above, and as a result, fluffing is easily caused in a tearing end face or the like due to the deformed portion and the liquid as a packed material is adhered to the fluffs to bring about the lowering of a liquid draining property and cause contamination of an outer vessel and so on.

Solution for Task

This invention is made for solving the above task and an object thereof is to provide a pouring nozzle made from a packaging laminate film which is excellent in the tear opening property and improves the lowering of a liquid draining property during the pouring, and a method of forming a tear-inducing flaw for opening in the packaging laminate film preferably used in a package bag or the like for storing and keeping a liquid packed material.

The invention is a pouring nozzle made from a packaging laminate film with a laminate structure of not less than three layers comprised of a base film layer and non-oriented sealant layers laminated on front and rear surface sides of the base film layer and having a pouring path at its center portion, characterized in that a tear-inducing flaw is formed by irradiating a laser beam across the pouring path and to a position where a portion of at least one of the non-oriented sealant layers on the front and rear surface sides of the base film layer is displaced by pushing.

In the pouring nozzle according to the invention, the followings can provide more preferable solution means:

(1) the non-oriented sealant film in an outer surface side of the pouring nozzle is displaced by pushing aside;

(2) the base film layer is made of polyester film (hereinafter referred to as "PET film"), nylon film (hereinafter referred to as "NY film") or ethylene vinyl alcohol copolymer film (hereinafter referred to as "EVOH film") and the non-oriented sealant layer is made of polyethylene film (hereinafter referred to as "PE film"), polypropylene film (hereinafter referred to as "PP film"), ionomer film (hereinafter referred to as "IO film" or ethylene vinyl acetate copolymer film (hereinafter referred to as "EVA film");

(3) a width of the tear-inducing flaw is a range of 50-500 μm;

(4) a width of the portion displaced by pushing in the non-oriented sealant layer is a range of 100-3000 μm;

(5) a thickness of the base film layer in a position of forming the tear-inducing flaw is not more than ⅓ of a thickness of the other position of the base film layer not forming the tear-inducing flaw;

(6) a remaining thickness of the portion displaced by pushing in the non-oriented sealant layer from the base film layer is a range of 0-10 μm.

Further, the invention is a method of forming a tear-inducing flaw in a packaging laminate film with a laminate structure of not less than three layers comprised of a base film layer and non-oriented sealant layers laminated on front and rear surface sides of the base film layer, characterized in that at least one of the non-oriented sealant layers on the front and rear surface sides is preliminarily displaced by pushing at a predetermined forming position of a tear-inducing flaw and thereafter a laser beam is irradiated at a position corresponding to a portion displaced by pushing to cause sublimation, elimination or evaporation of only the base film layer to thereby form a tear-inducing flaw.

In the method of forming a tear-inducing flaw according to the invention, the followings can provide more preferable solution means:

(1) the tear-inducing flaw is provided at a predetermined opening position of a pouring nozzle made from the packaging laminate film;

(2) the base film layer has an absorption rate to a laser beam higher than that of the non-oriented sealant layer;

(3) the laser beam is carbon dioxide laser or YAG laser;

(4) the non-oriented sealant layer is displaced by pushing with a rotating roller under heating or at room temperature, or a pressure plate under heating or at room temperature;

(5) a heating temperature of the rotating roller or the pressure plate is higher than a softening temperature of the non-oriented sealant layer;

(6) a remaining thickness of the non-oriented sealant layer displaced by pushing from the base film layer is a range of 0-10 μm.

Effect of the Invention

In the pouring nozzle made from the packaging laminate film according to the invention, at least one of the non-oriented sealant layers laminated on the front and rear surface sides of the base film layer is displaced by pushing and the laser beam is irradiated to a position displaced by pushing to sublimate, eliminate or evaporate only the base film layer, whereby a tear-inducing flaw is formed based on the thinning, weakening and so on of the base film layer as a support base material. In the invention, therefore, the pouring port of the pouring nozzle can be opened simply by tearing with fingers in the position of the tear-inducing flaw extending across the pouring path, while the non-oriented sealant layer is not stretched with the tearing because the non-oriented sealant layer laminated on the base film layer is previously displaced by pushing, and hence there is no fear in the occurrence of the fluffing or the like and the deterioration of the liquid draining property.

When the base film layer is made of one of PET film, NY film and EVOH film and the non-oriented sealant film is made of one of PE film, PP film, IO film and EVA film, the absorption rate of the base film layer to the laser beam can be easily raised as compared to that of the non-oriented sealant layer preliminarily displaced by pushing as mentioned above and hence the liquid draining property can be more improved.

In the pouring nozzle according to the invention, the packaging laminate film constituting the pouring nozzle has a laminate structure of three layers composed of the base film layer and the non-oriented sealant layers laminated on the front and rear surface sides of the base film layer, so that the irradiation of the laser beam to the base film layer can be performed by displacing the non-oriented sealant layer by pushing without considering a middle layer, a vapor-deposited layer, an adhesive layer and so on, and the formation of the tear-inducing flaw is easy.

The width of the tear-inducing flaw in the base film layer is preferably a range of 50-500 μm more preferably a range of 100-200 μm. In this case, the film-shaped pouring nozzle can be tear-opened along the tear-inducing flaw accurately with small force, so that the teared end face becomes sharp and there is no fluffing.

When the tear-inducing flaw is preliminary formed at each required position of the front and rear packaging laminate films and then the front and rear laminate films are superposed so as to overlap the tear-inducing flaws with each other and their peripheral edge portions are joined by fusion, the width of the tear-inducing flaw is preferable to be not less than 50 μm for removing the superposition error of the two laminate films and the influence of heat strain or the like by the fusion. On the other hand, when the width of the tear-inducing flaw exceeds 500 μm, the tearing strength becomes too low and there is a fear of causing an unintended burst, breakage or the like of the bag.

When the width of the portion displaced by pushing in the non-oriented sealant layer is a range of 100-3000 μm more preferably 200-1000 μm, the easy tearing can be ensured sufficiency while maintaining the required properties together with the base film layer.

In other words, if the width displaced by pushing is less than 100 μm, it is impossible to accurately specify the position of forming the tear-inducing flaw by the laser irradiation, while if it exceeds 3000 μm, the volume of the non-oriented sealant layer displaced by pushing is too large, and hence the film thickness on both sides of the portion displaced by pushing becomes too large.

The tear-inducing flaw is preferable to be a continuous or intermittent thin-thickness portion of the base film layer extended linearly or curvedly. The shape of the tear-inducing flaw can be selected linearly, curvedly, curved-linearly or the like as required, and the tear-inducing flaw formed by the thin-thickness portion is preferable in view of securing the easy tearing with hands and fingers.

In this case, it is preferable to form the tear-inducing flaw at a distance of not less than 1.0 mm separated from the peripheral joining edge portion of the packaging laminate film for avoiding an unintended opening of the package bag during handling or the like.

The thickness of the portion forming the tear-inducing flaw in the base film layer is preferable to be not more than ⅓ of the thickness of the other position not forming the tear-inducing flaw in the base film layer in view that the required properties are developed sufficiently in the base film layer and the easy tearing can be ensured as expected.

When the remaining thickness of the non-oriented sealant layer from the base film layer after the displacement by pushing on the irradiation side of the laser beam from is a range of 0-10 μm, it is possible to effectively destroy the non-oriented sealant layer having a low absorption rate by irradiating the laser beam to the base film layer. Therefore, there is no possibility that the non-oriented sealant layer laminated on the base film layer is separated away from the base film layer due to the stretching deformation by the irradiation of the laser beam, and the liquid draining property can be greatly improved by effectively preventing the teared surface from fluffing or the trapping of the liquid material in the package bag thereto.

When the non-oriented sealant layer located on the outer surface side of the pouring nozzle is displaced by pushing, there is a merit that the pouring nozzle can be easily manufactured. Moreover, the non-oriented sealant layer located on the inner surface side of the pouring nozzle and strongly laminated on the base film layer can be teared easily without stretching in the tearing of the base film layer and droplets trapped to the teared end face are sufficiently small and eventually sucked into the pouring nozzle, so that there is no problem of causing contamination of the surroundings with the droplets.

In the method of forming the tear-inducing flaw for opening in the packaging laminate film preferably used in the package bag or the like for filling a liquid material, the non-oriented sealant layer including or not including a middle layer, adhesive layer, water-repellent layer and so on in the vicinity of the predetermined tearing position is displaced by pushing under heating or at room temperature prior to the irradiation of the laser beam to the oriented or non-oriented base film layer to sublimate, eliminate or evaporate only the base film layer. According to this method, the non-oriented sealant layer is not separated from the base film layer due to the stretching deformation associated with the sublimation or the like of the base film layer as in the prior art, and the occurrence of the fluffing at the teared end face resulting from the stretching of the non-oriented sealant layer can be suppressed effectively to improve the liquid draining property.

And also, the forming method of the invention can be preferably applied to the formation of the tear-inducing flaw in the predetermined opening position of the pouring nozzle made from the packaging laminate film.

According to this forming method of the tear-inducing flaw, since the base film layer as a support base material is thinned or weakened in the predetermined opening position of the package bag and so on made from, the packaging laminate film, the tear-inducing flaw can be teared easily with hands and fingers. Moreover, when the non-oriented sealant layer laminated, for example, on the front surface side of the base film layer is displaced by pushing, the non-oriented sealant layer on the rear surface side remains as it is, but the non-oriented sealant layer is strongly laminated onto the base film layer, so that it is teared integrally therewith without stretching with an excellent tearing property of the base film layer and hence the fluffing is not generated in the teared end face.

When the base film layer is sublimated, eliminated or evaporated by the irradiation of the laser beam, the non-oriented sealant layer remaining in the position displaced by pushing and so on are broken absolutely under a small absorption rate to the laser beam, so that there is no fear of causing the fluffing in the tearing due to the stretching deformation of the non-oriented sealant layer (the separation from the base film layer), and it is possible to effectively eliminate the lowering of the liquid draining property.

When the base film layer is made of one of PET film, NY film and EVOH film and the non-oriented sealant film is made of one of PE film, PP film, IO film and EVA film, the absorption rate of the base film layer to the laser beam can be raised simply as compared to that of the non-oriented sealant layer previously displaced by pushing, whereby the liquid draining property can be improved more.

The carbon dioxide gas laser or YAG laser is preferable to be used as a laser beam irradiation oscillation device because of a high efficiency and a high output.

Incidentally, a laser wavelength for forming the tear-inducing flaw in the base film layer is preferable to be a range of 9.0-11.5 μm, more preferably 9.3-10.6 μm in case of the carbon dioxide gas laser, and a range of 0.3-3.0 μm, more preferably 0.5-1.0 μm in case of the YAG laser. Moreover, the laser wavelength is preferable to be selected properly in accordance with conditions such as the composition, thickness and nerve of the packaging laminate film and the variety of the material to be packed and so on.

The displacement by pushing in the non-oriented sealant film which may include a middle layer, a vapor-deposited layer, an adhesive layer, a water-repellent layer and so on is preferable to be performed with a rotating roll under heating or at room temperature or with a pressing plate under heating or at room temperature in accordance with the variety of the non-oriented sealant layer and so on in view of increasing the efficiency and securing the volume of the displacement by pushing. And also, the volume of the non-oriented sealant layer displaced by pushing can be kept properly when the heating temperature of the rotating roll or the pressing plate is made higher than the softening temperature of the non-oriented sealant layer.

EMBODIMENTS FOR CARRYING OUT THE INVENTION

An embodiment in the method of forming a tear-inducing flaw in a packaging laminate film according to the invention will be described with reference to the drawings.

Figure 1A:
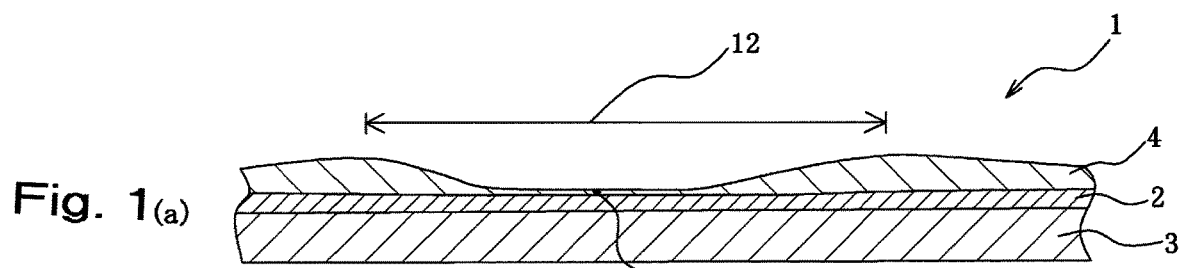
FIG. 1(a) is a cross sectional view illustrating a state of displacing a non-oriented sealant layer by pushing in a predetermined tearing position of a packaging laminate film having a three-layer laminate structure and FIG. 1(b) is a cross sectional view illustrating a state of irradiating a laser beam in a position displaced by pushing and FIG. 1(c) is a cross sectional view illustrating a state of forming a tear-inducing flaw in a PET film as a base film layer by irradiating a laser beam.
Figure 1B:
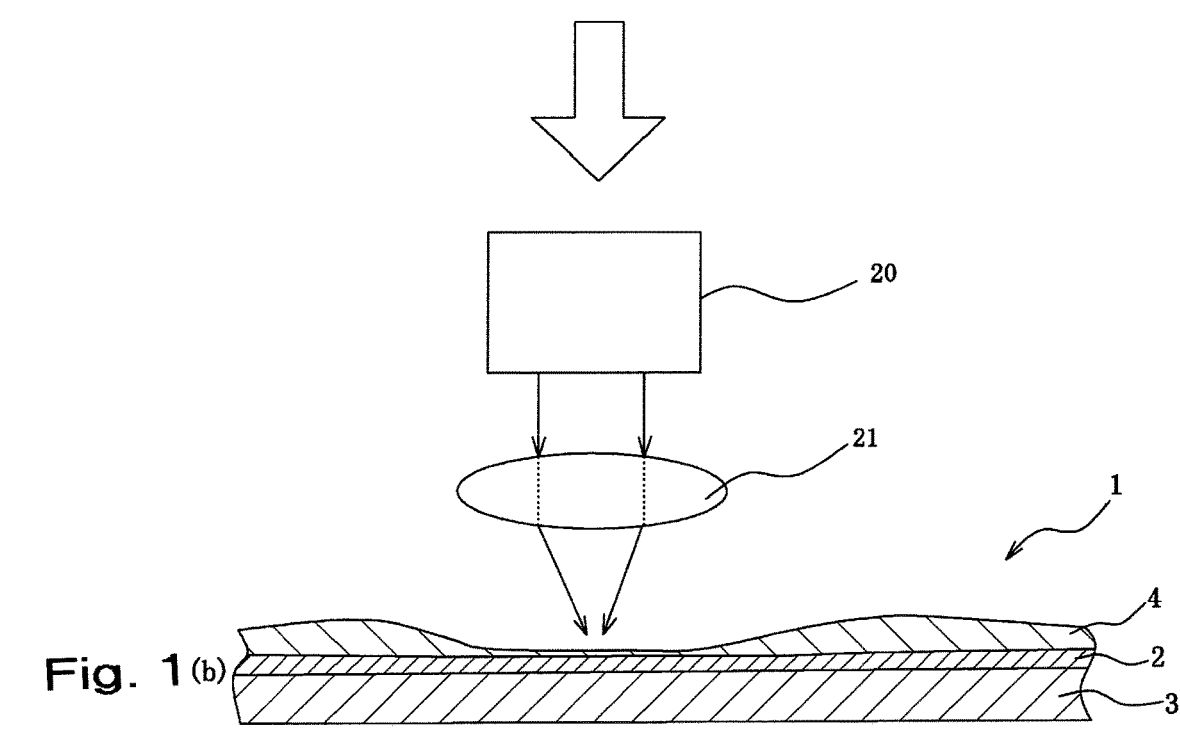
Figure 1C:
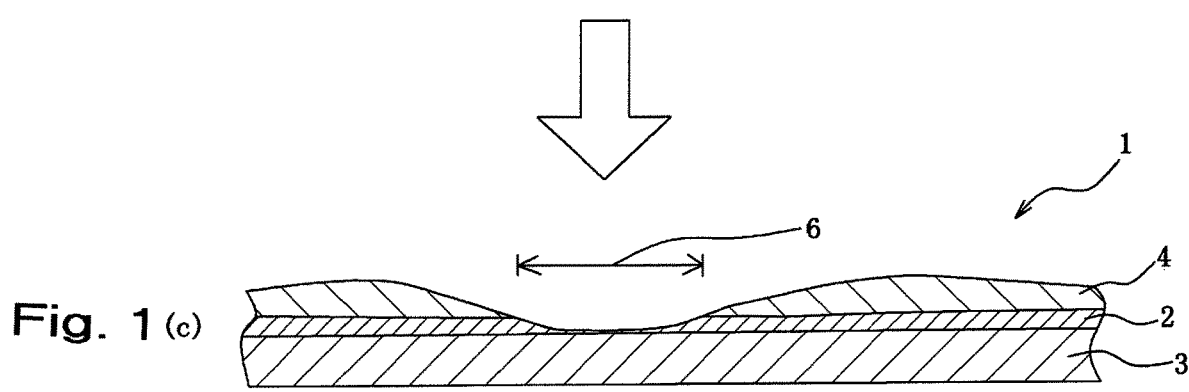

FIG. 1 is a view explaining a method of forming a tear-inducing flaw in a packaging laminate film 1 having a three-layer laminate structure. FIG. 1(a) is a cross sectional view illustrating a state of displacing a non-oriented sealant layer by pushing in a predetermined tearing position of the packaging laminate film having the three-layer laminate structure, and FIG. 1(b) is a view illustrating a state of irradiating a laser beam to a position displaced by pushing and FIG. 1(c) is a cross sectional view illustrating a state of forming a tear-inducing flaw in a PET film as a base film layer by irradiating a laser beam.

The packaging laminate film 1 having the three-layer laminate structure comprises a PET film as a thermoplastic axially or biaxially oriented or non-oriented base film layer 2 and non-oriented sealant layers 3, 4 laminated directly onto the both surfaces of the base film layer 2.

As shown in FIG. 1(a), at least one of a front side and a rear side of the non-oriented sealant layers 3, 4 located on the front and rear surface sides, or the non-oriented sealant layer 4 in FIG. 1(a) is first displaced by pushing under heating and pressing in a position corresponding to a predetermined place of a tear-inducing flaw formed in the PET film as the base film layer 2 with a rotating roll (not shown) heated, for example, to a range of 80-140° C., whereby a displaced portion 12 is formed.

Thus, the non-oriented sealant layer 4 is pushed aside in a range of 100-3000 μm, preferably 200-1000 μm in the displaced portion 12, in which a remaining thickness D of the non-oriented sealant layer 4 from the base film layer 2 is, for example, about 0-10 μm and becomes at a thin state or almost disappeared state.

Thereafter, laser beams irradiated from a laser oscillation device 20 are focused to the displaced portion 12 by a condenser 21 as shown in FIG. 1(b). As shown in FIG. 1(c), the base film layer 2 in the displaced portion 12 by the irradiation of the laser beam is weakened by sublimation, elimination or evaporation to form a tear-inducing flaw 6 at a width of 50-500 μm, preferably 100-200 μm.

Moreover, the heating temperature of the rotating roll or the pressing plate for displacing the non-oriented sealant layer 3, 4 by pushing is made to not lower than a softening temperature of the non-extended sealant layer, whereby the non-oriented sealant layer 3, 4 can be displaced by pushing at an appropriate volume. For example, when the non-oriented sealant film 3, 4 is PE film, the softening temperature is about 80-90° C. and the melting temperature is about 110-140° C., so that it is preferable to use the rotating roll or the pressing plate heated to a range of 80-140° C.

In this case, the width of the displaced portion 12 in the non-oriented sealant layer 3 (width between top portions) is 100-3000 μm, more preferably 200-1000 μm. When the width is less than 100 μm, it is impossible to accurately specify the forming position of the tear-inducing flaw 6 by the irradiation of the laser beam, while when it exceeds 3000

µm, the volume of the non-oriented sealant layer 3 displaced becomes too large and the film thickness on both sides of the displaced portion 12 becomes too large.

The width of the tear-inducing flaw 6 in the base film layer 2 is preferable to be not less than 50 µm in consideration with an error in the superposition and an influence of heat strain or the like in the heat sealing when the two packaging laminate films are superposed so as to always and surely overlap a tear-inducing flaw 6 on the front side and a tear-inducing flaw 6 on the rear side. On the other hand, it is preferable to be not more than 500 µm considering the tearing force, deterioration of the physical properties, burst and breakage of the bag and so on.

As the base film layer 2 having a high absorption rate to the laser beam can be used NY film layer and EVOH film layer in addition to the PET film layer. As the non-oriented sealant layer 3, 4 having a low absorption rate to the laser beam can be used PET film layer, PP film layer, IO film layer and EVA film layer.

As the laser beam oscillation device 20, a carbon dioxide gas laser or a YAG laser is preferable because of its high efficiency and high output.

The laser wavelength of the carbon dioxide gas laser is preferable to be a range of 9.0-11.5 µm, more preferably 9.3-10.6 µm, and the wavelength of the YAG laser is preferable to be a range of 0.3-3.0 µm, more preferably 0.5-1.0 µm. Moreover, the laser wavelength can be selected properly in accordance with the composition, thickness and nerve of the packaging laminate film 1, the variety of material to be packed and so on.

Figure 2:
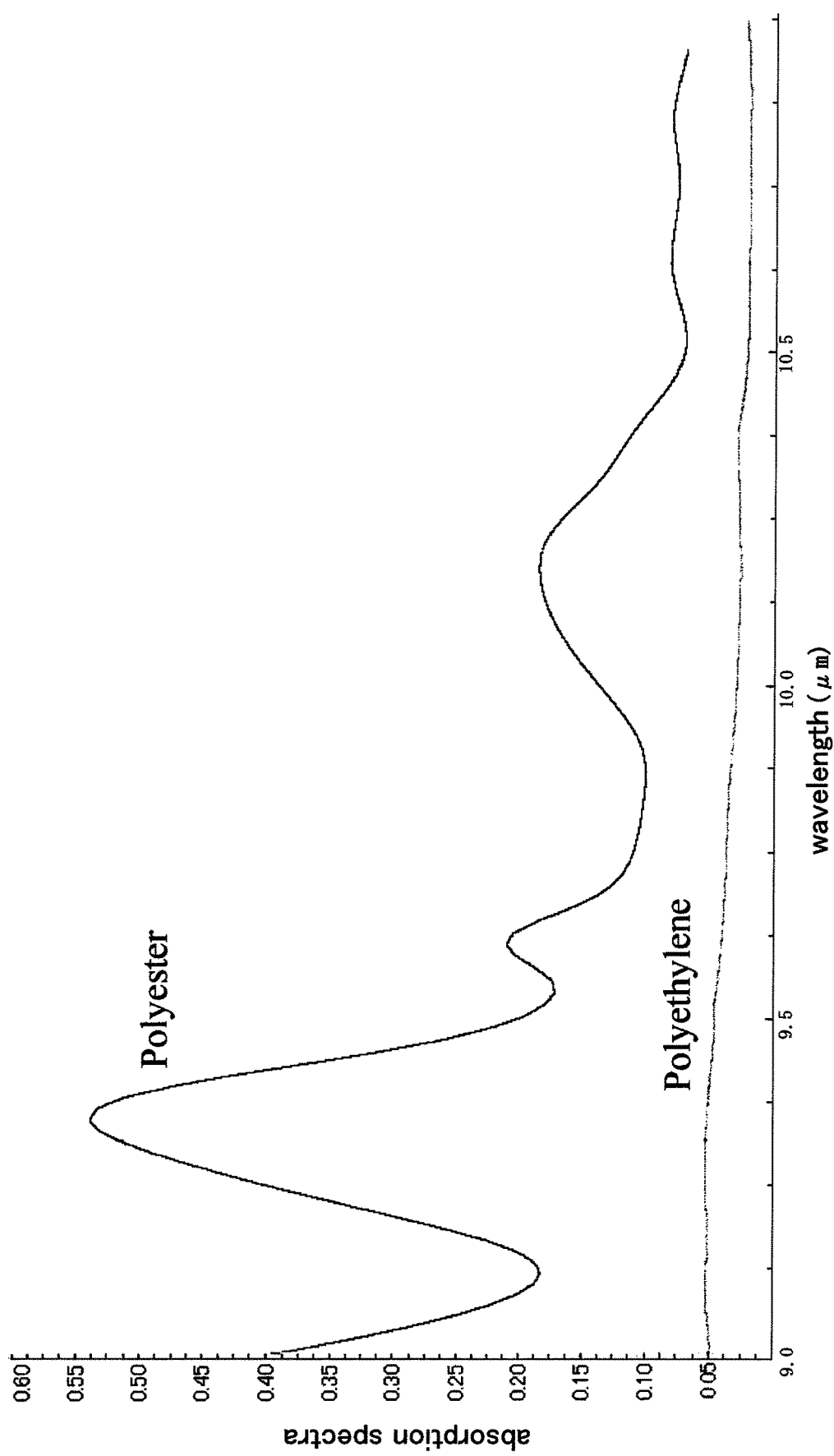
FIG. 2 is a view showing absorption spectra of a PET film and a PE film to a laser beam, respectively.

FIG. 2 is a view showing laser beam absorption spectra of the oriented or non-oriented PET film layer and the non-oriented PE film layer, respectively. It can be seen from this figure that the absorption rate of the PET film layer as the base film layer 2 is much higher than that of the PE film layer as the non-oriented sealant layers 3, 4.

Figure 3:
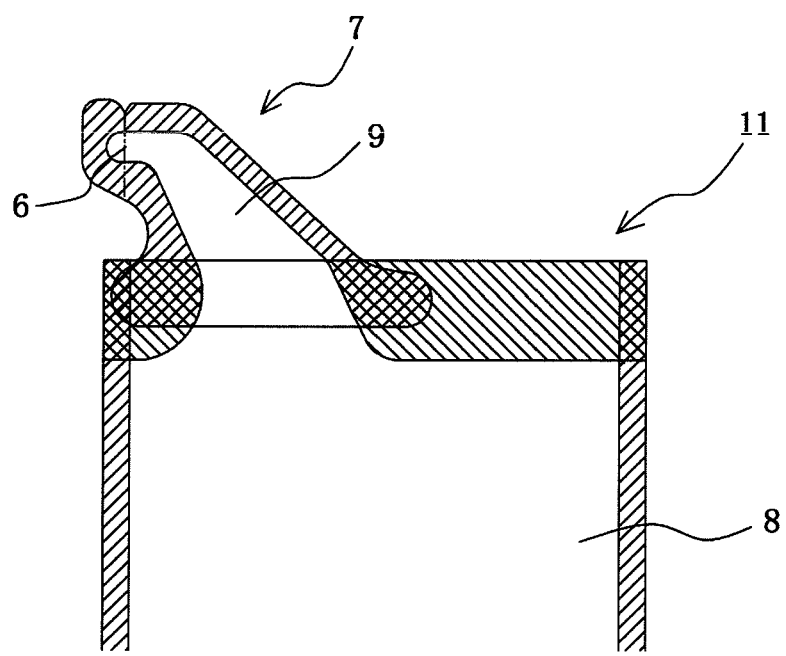
FIG. 3 is a plane view illustrating a joining example in a film-shaped pouring nozzle according to the invention.
Figure 4:
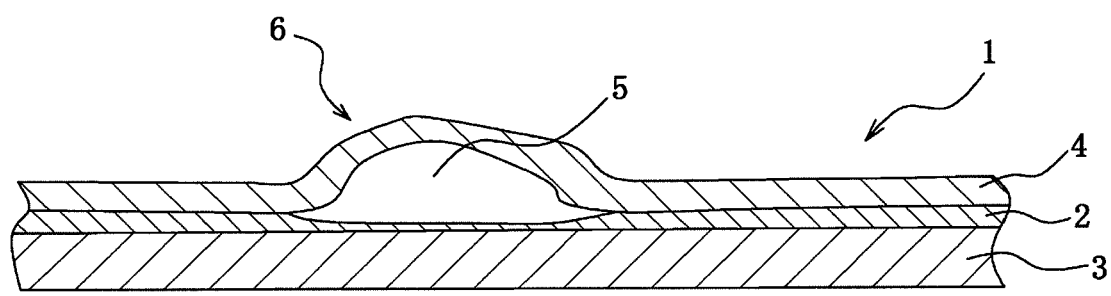
FIG. 4 is a cross sectional view illustrating a packaging laminate film of the prior art.

FIG. 3 is a plane view illustrating an embodiment of the pouring nozzle 7 made from the packaging laminate film according to the invention. The pouring nozzle 7 has a three-layer laminate structure of a thermoplastic oriented or non-oriented PET film layer as the base film layer 2 and the non-oriented sealant layers 3, 4 laminated on both sides thereof wherein a thin and flat packaging laminate film is folded in a half width or two packaging laminate films are superposed and the opposed non-oriented sealant layers 3 are joined to each other at an outer peripheral portion other than a base portion of the laminate film as shown by hatching in the figure with a width of 0.05-3.0 mm, more preferably 0.1-1.0 mm without generating wrinkles to define a pouring path 9 in a central portion of the laminate film.

The pouring nozzle 7 is preferable to have a self-seal non-return function preventing the invasion of ambient air into an interior of a package bag body 8 by interposing a thin film of a liquid packed material in the pouring path 9 formed between the non-oriented sealant layers 3 mutually opposed on the inner surface side.

The required tear-inducing flaw 6 extending across the pouring path 9 can be formed in the pouring nozzle 7 by displacing the non-oriented sealant layer 4 on the outer surface side at a predetermined tearing position of the non-oriented sealant layer 4 over a top distance of 100-3000 µm, preferably 200-1000 µm with the cooperation of the rotating roll heated to about 80-140° C. and the pressing plate supporting the non-oriented sealant layer 3 on the inner surface side at room temperature, and irradiating laser beams to the predetermined tearing position of the pouring nozzle 7 under solidification of the non-oriented sealant layer 4 to sublimate, eliminate or evaporate only the base film layer 2.

In the film-shaped pouring nozzle 7 according to the invention, it is preferable to displace only the non-oriented sealant layer 4 on the outer surface side shown in FIG. 1 by pushing in advance as mentioned above.

The width of the tear-inducing flaw 6 in the PET film layer as the base film layer 2 is preferable to be a range of 50-500 µm, more preferably 100-200 µm as previously mentioned.

Such a film-shaped pouring nozzle 7 is fusion-joined simply, rapidly and surely at a state of protruding from an upper portion to a side or from a top portion to an upper portion of a package bag body 8 by fusing the non-oriented sealant layer 4 on the outer surface side of the pouring nozzle 7 at its base end portion to a non-oriented sealant layer on the inner surface side of the package bag body 8, for example, by heat sealing to thereby constitute a package bag 11. The pouring of the liquid material filled and packed in the package bag 11 can be performed by tearing off the tip side with hands and fingers along the tear-inducing flaw 6 provided in the vicinity of the tip of the pouring nozzle 7.

In the forming position of the tear-inducing flaw 6 provided disposed in the vicinity of the tip of the pouring nozzle 7, the base film layer 2 as the support basis material is thinned or the like by the sublimation or the like through the irradiation of the laser beam, so that the tearing force necessary for opening the pouring nozzle 7 can be made small sufficiently and the fluffing cannot be caused by the tearing trace of the base film layer 2. Therefore, the base film layer 2 in the opening position can be made smooth enough and the front and rear packaging laminate films 1 can be adhered strongly because of the increase of the joining strength and the flatness therebetween. When the pouring nozzle 7 has the above self-seal one-way function, the invasion of ambient air into the package bag body 8 can be prevented effectively and the one-way function thereof can be improved.

On the other hand, in order to remove a fear of opening by mistake in the handling of the package bag 11 due to the excessive lowering of the tearing force required for the opening of the pouring nozzle 7 along the tear-inducing flaw 6, it is preferable to leave about 1.0-2.0 mm of a portion not irradiated by the laser beam on the upper end and/or the lower end of the tear-inducing flaw 6 when the tear-inducing flaw 6 is disposed across the pouring path 9 of the pouring nozzle 7. In this case, the burst strength can be increased to remove the possibility of being opened by mistake.

Moreover, the non-oriented sealant layer 3 on the inner surface side of the pouring nozzle 7 laminated on the base film layer 2 at a side opposing to the side irradiated by the laser beam is supported by the rotating roll or the pressing plate at room temperature and strongly laminated onto the base film layer 2. When the base film layer 2 is teared along the tear-inducing flaw 6, therefore, the tearing is performed very smoothly based on the excellent tearing property of the base film layer 2, and hence the fluffing is not caused in the teared end face and the deterioration of the liquid draining property is not caused in the non-oriented sealant layer 3.

As shown in FIG. 3, the tear-inducing flaw 6 can be extended in linear or curved shape and formed continuously or intermittently. When the tear-inducing flaw 6 is provided in a continuous linear shape so as to extend across the pouring path 9 of the film-shaped pouring nozzle 7, the opening edge can be made to a required shape such a curved shape or the like by tear-opening the pouring nozzle 7 along the tear-inducing flaw 6. Further, even if a pouring port is large for a large capacity bag, the tear-inducing flaw 6 can induce a tear-travelling direction of the film-shaped pouring nozzle 7 accurately.

Moreover, when the tear-inducing flaw 6 is formed so as to protrude its opening edge curvedly in the pouring direction of the packed material, even if the volume of the packed material retained in the package bag is decreased to reduce the pouring force, the packed material in the bag is transmitted along the curved opening edge and dropped off from a narrow area of the curve-shaped protruding tip, whereby the liquid draining property can be improved and the adhesion of the packed material to the opening edge is not caused and the possibility of generating the liquid dripping and the staining of the circumstance can be removed effectively.

Especially, when the tear-inducing flaw 6 is continuously and linearly formed in the base film layer 2, even if the base film layer 2 is an axially or a biaxially oriented film layer, the package bag 11 can be opened by simply tearing the tip portion of the pouring nozzle 7 with hands and fingers irrespectively of the orientation direction. And also, since the front and rear packaging laminate films 1 can be superposed easily so as to align the continuously linear tear-inducing flaw 6, the generation of the liquid dripping can be suppressed effectively even if the liquid filled and packed in the package bag 11 has a high viscosity like dressing or the like.

Moreover, since the biaxially oriented PET film layer having high strength, various barrier properties and so on can be used as the base film layer 2 of the pouring nozzle 7, the invention is expected to be used to an application requiring a heat resistance such as a hot pack or a retort pouch.

In the packaging laminate film 1 constituting the film-shaped pouring nozzle 7, the axially- or biaxially-oriented or non-oriented base film layer 2 is preferable to be made of any one of PET film layer, NY film layer and EVOH film layer and the non-oriented sealant layer 3, 4 is preferable to be made of any one of PE film layer, PP film layer, IO film layer and EVA film layer.

Moreover, when the packaging laminate film 1 is a three-layer laminate structure of the base film layer 2 and the non-oriented sealant layers 3, 4 laminated on front and rear surface sides of the base film layer 2, it is possible to irradiate the laser beam to the base film layer 2 easily by displacing at least the non-oriented sealant layers 3, 4 without considering a middle layer, a vapor-deposited layer and so on.

In case of forming a surface coat such as water-repellent layer or the like, it is preferable to be performed by printing or the like after the displacement of the non-oriented sealant layer 4 by pushing and the irradiation of the laser beam to the base film layer 2.

The tear-inducing flaw 6 in the base film layer 2 is preferable to be a continuous or intermittent thinned portion of the base film layer 2 extending linearly or curvedly as mentioned above. The thickness of the base film layer 2 in the forming position of the tear-inducing flaw 6 is preferable to be not more than ⅓ of the other portion not forming the tear-inducing flaw 6.

To this end, the thickness of the packaging laminate film 1 in the teared edge face along the tear-inducing flaw 6 of the pouring nozzle 7 becomes thinner up to about 70% of the thickness of the other portion in the packaging laminate film 2 through the displacement of the non-oriented sealant layer 4 in the outer surface side by pushing and the thinning of the base film layer 2 by irradiation of the laser beam. Therefore, even if the liquid as the packed material in the package bag is adhered to the teared edge face of the pouring nozzle 7, since the contact area is small, the packed material cannot be held and is dropped down instantly to improve the liquid draining property and also the fear of staining the pouring port or causing the liquid dripping due to the remaining of the droplets and staining the surroundings can be prevented effectively.

Moreover, the remaining thickness of the non-oriented sealant layer 4 displaced by pushing on the pouring nozzle 7 from the base film layer 2 (D in FIG. 1(*a*)) is preferable to be a range of 0-10 μm.

When the non-oriented sealant layer 4 has the above remaining thickness, even if it has a small absorbance rate to the laser beam, the non-oriented sealant layer 4 is broken sufficiently by irradiating the laser beam to the base film layer 2 and the elongation deformation of the non-oriented sealant layer 4 can be prevented in the tearing of the tip portion of the pouring nozzle 7 along the tear-inducing flaw 6 and the fear of lowering the liquid dropping property can be removed effectively.

INDUSTRIAL APPLICABILITY

Although the above is explained with respect to the packaging laminate film 1 having a three-layer laminate structure of a base film layer and non-oriented sealant layers 3, 4 laminate on both sides of the base film layer, the invention is applicable to a case that a water-repellent layer is formed on the outer surface or one or plural middle layer(s), vapor-deposited layer(s), adhesive layer(s) and so on is interposed.

DESCRIPTION OF REFERENCE SYMBOLS

1 packaging laminate film
2 base film layer
3, 4 non-oriented sealant layer
5 cavity
6 tear-inducing flaw
7 film-shaped pouring nozzle
8 package bag body
9 pouring path
11 package bag
12 displaced portion by pushing
20 laser beam oscillator
21 collector

The invention claimed is:

1. A pouring nozzle comprising:
   a packaging laminate film, which the pouring nozzle is made from, with a laminate structure of not less than three layers comprised of a base film layer and non-oriented sealant layers laminated on front and rear surface sides of the base film layer and having a pouring path at its center portion, wherein
   a tear-inducing flaw is formed by irradiating a laser beam across the pouring path and to a position where a portion of at least one of the non-oriented sealant layers on the front and rear surface sides of the base film layer is displaced by pushing.

2. The pouring nozzle according to claim 1, wherein a non-oriented sealant film of the non-oriented sealant layers that is in an outer surface side of the pouring nozzle is displaced by pushing aside.

3. The pouring nozzle according to claim 1, wherein the base film layer is made of polyester film, nylon film or ethylene vinyl alcohol copolymer film and the non-oriented sealant layers are made of polyethylene film, polypropylene film, ionomer film or ethylene vinyl acetate copolymer film.

4. The pouring nozzle according to claim 1, wherein a width of the tear-inducing flaw is in a range of 50-500 μm.

5. The pouring nozzle according to claim 1, wherein a width of the portion displaced by pushing in the at least one of the non-oriented sealant layers is in a range of 100-3000 μm.

6. The pouring nozzle according to claim 1, wherein a thickness of the base film layer in a position of forming the tear-inducing flaw is not more than ⅓ of a thickness of a position of the base film layer not forming the tear-inducing flaw.

7. The pouring nozzle according to claim 1, wherein a remaining thickness of the portion displaced by pushing in the at least one of the non-oriented sealant layers from the base film layer is in a range of 0-10 μm.

8. A method of forming a tear-inducing flaw in a packaging laminate film with a laminate structure of not less than three layers comprised of a base film layer and non-oriented sealant layers laminated on front and rear surface sides of the base film layer, comprising:

preliminarily displacing at least one of the non-oriented sealant layers on the front and rear surface sides by pushing at a predetermined forming position of the tear-inducing flaw and thereafter irradiating a laser beam at a position corresponding to a portion displaced by pushing to cause sublimation, elimination or evaporation of only the base film layer to thereby form the tear-inducing flaw.

9. The method of forming the tear-inducing flaw according to claim 8, wherein the tear-inducing flaw is provided at a predetermined opening position of a pouring nozzle made from the packaging laminate film.

10. The method of forming the tear-inducing flaw according to claim 8, wherein the base film layer has an absorption rate to the laser beam higher than that of the non-oriented sealant layers.

11. The method of forming the tear-inducing flaw according to claim 8, wherein the laser beam is a carbon dioxide laser or YAG laser.

12. The method of forming the tear-inducing flaw according to claim 8, wherein the at least one of the non-oriented sealant layers is displaced by pushing with a rotating roller under heating or at room temperature, or a pressure plate under heating or at room temperature.

13. The method of forming the tear-inducing flaw according to claim 12, wherein a heating temperature of the rotating roller or the pressure plate is higher than a softening temperature of the at least one of the non-oriented sealant layers.

14. The method of forming the tear-inducing flaw according to claim 8, wherein a remaining thickness of the at least one of the non-oriented sealant layers displaced by pushing from the base film layer is in a range of 0-10 μm.

* * * * *